Oct. 12, 1937.   J. J. KESSLER   2,095,705
METHOD OF ENCLOSING COIL STRUCTURES
Filed Nov. 1, 1933
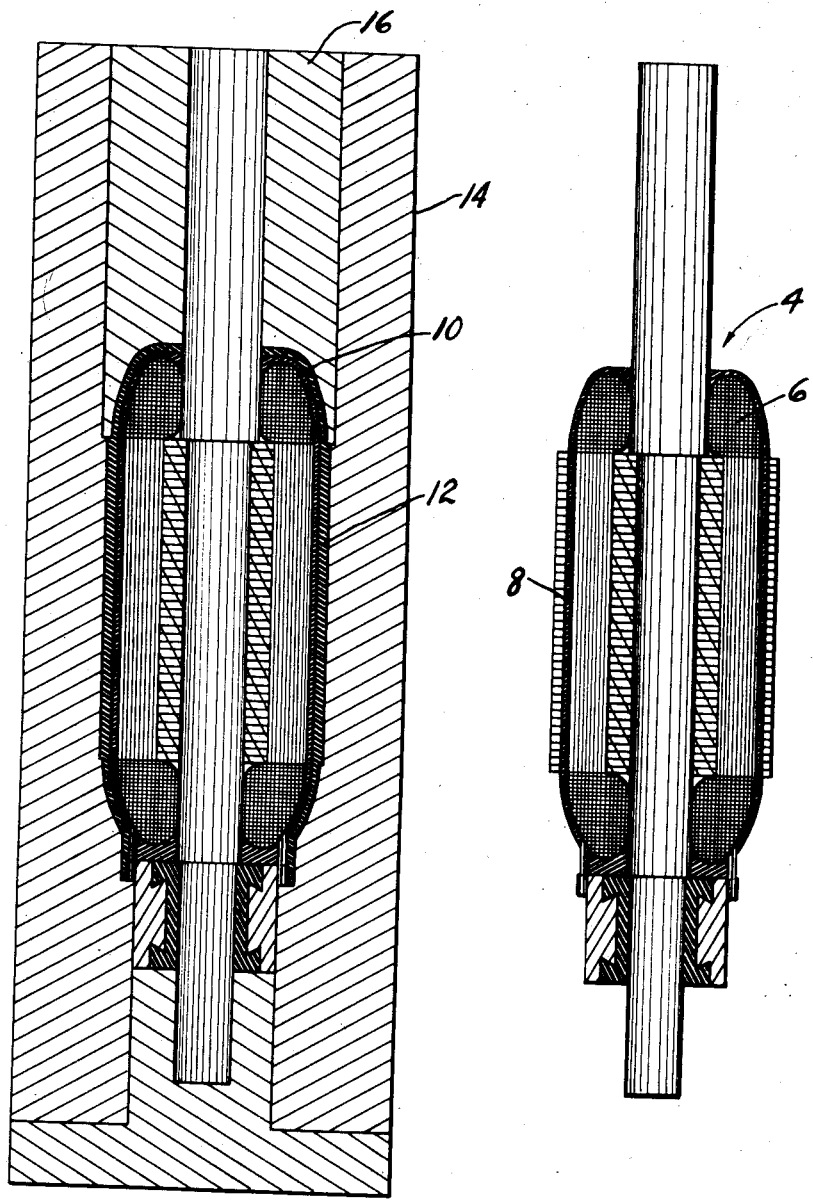
INVENTOR
John J. Kessler
By Frederick W. Catterman
Atty Patented Oct. 12, 1937

2,095,705

UNITED STATES PATENT OFFICE 2,095,705

METHOD OF ENCLOSING COIL STRUCTURES

John J. Kessler, St. Louis, Mo., assignor to Bessie D. Apple

Application November 1, 1933, Serial No. 696,226

1 Claim. (Cl. 175—21)

This invention relates to a process for enclosing coils of wire, and particularly electrical coils, and structures containing them with an insulating and protective envelope, and refers particularly to processes involving the use of molding compounds around coil structures.

My method of enclosing such coil structures serves to add an insulating and protective coating or covering to coils or to structures containing coils, of considerable mechanical strength, and without exposing the coil or structure containing coils to be covered, or partially covered to severe mechanical strains while providing the protective coating.

My method refers particularly to surrounding the coil structure with a "thermosetting" insulating compound applied with little or no pressure, then baking the coil structure to harden and stiffen the compound so used, and finally hot molding a compound around the heated coil with high pressure and heat.

I am aware that coils have been surrounded with hot molding compound, after previously treating them with phenol-aldehyde varnishes in order to strengthen them against the excessive strains of the hot molding. For illustration J. L. Milton, U. S. Patent 1,326,366 describes a process that involves a preliminary stiffening of the coil by impregnating it with a varnish of the phenol-aldehyde type, baking and then hot molding a molding compound of the same type around the coil.

Vincent G. Apple, U. S. Patent 1,440,951 teaches the art of molding armature and commutator in one solid molding. In U. S. Patent 1,440,952 this same inventor molds field frame and bearing ends into one solid molding. Likewise Vincent G. Apple 1,449,371 hardens phenol-aldehyde varnish around coils by hot molding.

My method of enclosing coil structures is an improvement over the teachings of Apple and of Milton in that I first surround the coil structure with a plastic cold molding compound that is applied with little or no pressure and without heat and which is afterwards hardened by heating, and this enclosed or partially enclosed coil structure is then hot molded with heavy pressure in order to give it a uniform dimension and a smooth finish. Milton provides for the stiffening of the coil with a varnish or impregnating compound, which necessarily enters the coil and which provides what may be called an internal stiffening. My method of stiffening is carried out by enveloping the coil structure as contrasted with the impregnation of it, and this envelopment may be laid on to a considerable thickness with very considerable strengthening of the coil structure, by reason of the definite shell of material that surrounds the coil structure and which consists of molding compound, which may contain considerable filling material such as wood flour or asbestos fibre, and may therefore be made much stronger than impregnating compound or insulating varnish, which necessarily consists of the pure resinous material, without pigment or filling material which would not enter through the porous structure of the coil.

When it is considered that the hot molding of a thermoplastic compound around a coil structure subjects it to pressures of several thousand pounds or more per square inch, and that this stress must be borne throughout all parts of the coil, it will be seen that it is important to strengthen the coil structure against these stresses. My method offers improvements in such strengthening processes and it also offers improvements in other respects of coil molding processes, which will now be described.

The enclosing of a coil structure in molding compound, besides engendering strains is a difficult process because of the difficulty in securing a uniform distribution of molding compound just where it is wanted. The enclosing envelope of molding compound is often of relatively small dimensions compared with the dimensions of the coil structure to be enclosed. A large part of the mold cavity is taken up with the coil structure to be enclosed or partially enclosed. The problem arises therefore in many cases of securing a uniform flow of molding compound around the coil structure. The molding compound often has to flow through constricted spaces in order to reach larger spaces. It is tending to set therefore just where the flow should be the greatest. My process does away with this difficulty, in that the envelopment of plastic molding compound may be laid around the coil structure with little pressure, as small as the pressure of the fingers, and worked into depressions and cracks, without impregnating the coil, but it serves its purpose by strengthening the coil from the outside.

Still another advantage of my method lies in the greatly reduced time required for doing the final hot molding operation in that a relatively large part of the completed envelope may be laid about the coil structure previous to hot molding and the time required for curing the hot molded portion is thereby reduced.

My method of enclosing coil structures involves three different steps or stages which will now be described and which must be carried out in the order given:

The first step in my method consists in laying around the coil structure with little or no pressure an envelope of soft and plastic cold molding compound by the process known as cold molding.

The second step of my method consists in baking the coil structure, without pressure, in order to set and harden the thermosetting compound used. This serves to set the soft and putty-like plastic material into a strong, hard and non-plastic mass which encloses the whole coil structure and enables it to withstand the high pressures to which it is to be subjected in the final hot molding.

The third step of my method consists in hot molding a final layer around the coil structure and its envelope of supporting material, which envelope has already been hardened by heat, and which serves to prevent the pressure of the hot molding operation from crushing the coil structure.

In order to carry out my method it is only necessary to use a pressure for hot molding which is less than the crushing strength of the plastic molding compound which has already been hardened and cured by heating.

By carrying out my method I secure a smooth coil structure of uniform dimensions, with the molding compound distributed uniformly where it is wanted and in which the coil is uninjured because the pressures used in the hot molding operation are removed largely from the coil structure by having it already enclosed by a hardened thermosetting compound, which has been previously set by baking without pressure.

In the accompanying drawing, Figs. 1 and 2 are axial sections through an armature showing the first and second molding steps respectively of my process. In Fig. 2 the armature is shown in the mold. Reference is made to these views in giving the following example which is given merely as a concrete example of the general method here described.

*Example.*—An electrical armature 4 is first treated with a plastic cold molding compound which has been made by incorporating asbestos fibre with a thermosetting material such as a drying and polymerizing oil prepared by the action of chemical bodies having a mobile methalene group upon tar fractions having a boiling range between 150° C. and 250° C. The preparation of such an oil is described in my U. S. Patent 1,739,597. This putty-like material is worked into the ends of the armature coils with the fingers and is smoothed down so that the armature 4 has its coil ends 6 and part of the open spaces of its slots as at 8 filled with the putty-like material. The armature is then baked in an oven at a low temperature at first and then, as the putty-like material begins to harden, at higher temperatures, until it has been converted into a relatively infusible and non-softening condition. Temperatures around 180 deg. F. may be used for the preliminary baking and temperatures around 300 deg. F. may be used for the final baking. The baked armature with its enveloped coil ends is then placed in the mold Fig. 2 and hot molded in the usual way with any type of hot molding compound desired, that is, the armature is placed in the mold 14 and the compound is placed under the plunger 16. Heat is then applied to the mold and pressure to the plunger, both heat and pressure being maintained until the plunger is forced into place, and the jacket thereby formed, the jacket being then hardened by the heat. 10 represents that part of the jacket covering the coil ends and 12 that part covering the coil sides.

Where I use two different molding compounds in carrying out my improved method, it is only necessary that the first compound be a "thermosetting", that is to say, it may be hardened merely by oxidation and may be a mixture of substances such as linseed oil and asphaltum with asbestos. The second compound used in the final step of hot molding, should preferably be a compound that hardens by polymerization, or without contact with air, such as a phenol-aldehyde type of molding compound.

Having described an embodiment of my invention, I claim:

The method of enclosing a coil structure with a shell of insulation, which consists of forming a coil structure by winding insulated wire into a coil having only air insulation between the turns of said insulated wire, forming a covering of non-impregnating putty-like material around said coil structure without heat or pressure, hardening said covering by heat, and molding a secondary covering of thermo-plastic thermo-setting insulation over the first covering under heavy pressure and heat.

JOHN J. KESSLER.